United States Patent Office 3,413,361
Patented Nov. 26, 1968

3,413,361
PROCESS FOR THE PRODUCTION OF
VINYL FLUORIDE
Louis Foulletier, Lyon, France, assignor to Ugine Kuhlmann, Paris, France, a French company
No Drawing. Filed Aug. 10, 1965, Ser. No. 478,751
Claims priority, application France, July 28, 1964, 983,231
5 Claims. (Cl. 260—653.4)

ABSTRACT OF THE DISCLOSURE

Vinyl fluoride is produced by passing a gaseous mixture of HF and acetylene containing above about 1 mole of HF to each mole of acetylene over a cadmium salt catalyst such as cadmium sulfate, cadmium nitrate, cadmium acetate or a mixture thereof at a temperature in the range between 100° C. and 600° C. The catalyst may be supported by a carrier such as activated carbon, zirconia and the like. The process, due to the extremely high selectivity of the catalyst, provides a conversion rate above about 98% and the product stream contains only a negligible amount of difluoroethane by-product.

---

This invention relates to a process for the production of vinyl fluoride by reacting HF and acetylene in the presence of a catalyst. The invention is based on the discovery that certain cadmium salts are highly effective as a catalyst for promoting the formation of vinyl fluoride in this process.

Reaction of HF and acetylene in a gaseous phase over a suitable catalyst for the production of vinyl fluoride and difluoroethane is well known. The catalyst used in this reaction includes mercury, alumina, and silver based compounds which, however, have not been completely satisfactory for reasons such as a short effective life, expensive and difficult to prepare, poor yield of products, and long induction period before the initiation of the reaction. For the purpose of preparing vinyl fluoride, a valuable monomer for the production of vinyl plastics and in other applications, these catalysts further exhibit poor selectivity for the formation of the monofluoro-compound.

Many attempts have been made to develop a process in which vinyl fluoride is the predominant product. For example, Hillyer et al. U.S. Patent No. 2,634,300 discloses a process in which difluoroethane formed in the reaction is separated from the product stream and recycled to obtain a higher yield of vinyl fluoride. The catalyst used is activated alumina which may also contain a small amount of fluoride of aluminum, antimony, cadmium, zinc, or cobalt. The process increased the yield of vinyl fluoride at the expense of increasing the complexity of the process, hence, at a higher process cost.

On the other hand, Skiles, as disclosed in his U.S. Patent No. 2,716,142, prefers to use a process in which the catalyst has a higher selectivity for the formation of vinyl fluoride. His catalyst is a reaction product of HF and a zinc compound, such as zinc oxide, zinc sulfide, or zinc nitrate, obtained by passing a gaseous mixture of HF and nitrogen through a bed of granulated zinc compound at a temperature from about 65° C. to 200° C. This treatment increases the selectivity of the catalyst for the formation of vinyl fluoride in the process. According to the patent, the process using the treated catalyst produces a produce containing as high as 67.7% vinyl fluoride. The amount of vinyl fluoride in the product stream, however, decreases rapidly after the catalyst has been used for a period of time. Sample taking after 30 hours, for example, contains only 11% of vinyl fluoride. As a comparison, Skiles shows that untreated zinc compounds as well as cadmium oxide fail as a catalyst for the production of vinyl fluoride.

I have now found that the defects and disadvantages of prior catalysts and processes are overcome by the process of this invention. Broadly stated, the process for the production of vinyl fluoride comprises passing a gaseous mixture of HF and acetylene, containing above about 1 mole of HF to each mole of acetylene, over a cadmium salt catalyst and recovering vinyl fluoride from the reaction mixture. The cadmium salts that are particularly suitable include cadmium sulfate, cadmium nitrate, and cadmium acetate. Preferably, the catalyst is deposited on a carrier such as activated carbon, alumina, zirconia, thoria, and other suitable catalytic carriers.

In carrying out the process of this invention, the temperature for the reaction can be maintained within a wide range. Preferably, the temperature is in the range between about 100° C. to about 600° C. The process can be carried out in any suitable reactor for a batchwise or a continuous process. For a continuous process, a fluidized bed reactor can be advantageously used in which the granulated catalyst of this invention is fluidized by the incoming gaseous mixture of HF and acetylene. In this process, the catalyst may be replaced or replenished periodically or continuously to maintain its catalytic strength.

The gaseous mixture of HF and acetylene should contain at least 1 mole of HF per each mole of acetylene. For a longer lifetime of the catalyst, an excess of HF should be used. Thus, the process may be carried out with a gaseous mixture containing 3 or more moles of HF per each mole of acetylene. In practice, however, an excess of 50% of HF is sufficient. I have observed that a catalyst of this invention accidentally poisoned by a reaction mixture containing an insufficient amount of hydrofluoric acid can recover its catalytic activity after working in a gaseous mixture containing an excess of hydrofluoric acid.

The process of this invention provides a conversion rate as high as 98% and even higher based on the acetylene used, and the product stream contains only a negligible amount of difluoroethane by-product, generally lower than about 0.1%. Productivity of this process is exceedingly high which reaches and oftentimes exceeds 600 g. of vinyl fluoride per hour per liter of catalyst. The cadmium salt catalysts have a long lifetime and usually no perceptible fall in catalytic activity can be detected after 50 hours of use. The superior results obtained in the process of this invention were heretofore unobtainable by the prior processes which is particularly surprising in view of the fact that zinc, cadmium, and mercury all belong to the same group 2B of the Periodical Table. As stated previously, mercury, zinc, and their compounds are deficient as catalysts for the production of vinyl fluoride. The catalysts used in the process of this invention are not particularly sensitive to the temperature variation which provides the present process with considerable advantages. Using this catalyst, the procedures for the removal of heat generated by the highly exothermic reaction of acetylene and HF can be greatly simplified.

Further to illustrate the process of this invention specific examples are described hereinbelow.

EXAMPLE I

A catalyst was prepared by impregnating granulated activated carbon with a cadmium sulfate solution to provide 19.3 grams of cadmium per 100 grams of catalyst or about 0.75 gram-atom cadmium per liter of catalyst. The activated carbon was obtained from hard wood which has high porosity and pore radii in the range between 30 and 3000 A. The particle size of the granulated carbon was in the range between 297μ and 500μ. 50 cm.³ of the prepared catalyst was placed in a mild steel tube and was heated to 300° C. in a current of nitrogen and hydrofluoric acid. Once the temperature reached 300° C., the nitrogen and HF gaseous mixture was replaced with an acetylene and HF gaseous mixture containing 1.5 moles of HF per mole of acetylene. The flow rate of the acetylene was 16 liters per hour.

The gaseous product from the reactor was washed with water and soda, dried and measured. The product composition was determined by means of a continuous chromatograph. It was noted that as soon as the HF and acetylene mixture was introduced into the reactor, the reaction proceeded satisfactorily and produced vinyl fluoride containing only traces of acetylene (about 0.5%) and difluoroethane (less than 0.1%). The transformation rate reached 99.5% and the vinyl fluoride obtained based on the amount of acetylene introduced was about 98%. After 50 hours, no noticeable loss in catalytic activity was observed and the product stream contained less than 5% acetylene.

EXAMPLE II

For the purpose of comparison a classic mercury catalyst, mercury cyanide deposited on the same type of activated carbon, as described in Example I, was used in the same apparatus as used in the previous example. The catalyst contained 20 grams mercury per 100 grams of catalyst. The reaction was carried out at 100° C. with a gaseous mixture containing 1.5 moles of HF per mole of acetylene and a flow rate of 5 liters of acetylene per hour. The analysis indicated that after the first ½ hour, there was little or no transformation of acetylene. The catalyst demanded some time before reaching a stable working condition. After one hour, the maximum transformation rate of 95% was reached which decreased continuously as the reaction proceeded. After 5½ hours, the transformation rate was 80%.

EXAMPLE III

The reaction was carried out similar to Example I with the exception that the catalyst was prepared by impregnating the activated carbon with a cadmium acetate solution to provide 0.75 gram-atom of cadmium per liter of catalyst or about 19.3 grams cadmium per 100 grams of catalyst. Results similar to Example I were obtained.

EXAMPLE IV

The reaction was carried out similar to Example I with the exception that the catalyst was prepared by impregnating the activated carbon with a cadmium nitrate solution to provide 0.75 gram-atom of cadmium per liter of catalyst or about 19.3 grams of cadmium per 100 grams of catalyst. Results similar to Examples I and III were obtained.

EXAMPLE V

The reaction was carried out similar to Example I with the exception that the catalyst was prepared by impregnating granulated zirconium oxide particles with a cadmium sulfate solution to provide 0.75 gram-atom cadmium per liter of catalyst which is 4.1 grams of cadmium per 100 grams of catalyst. The results obtained were similar to those in Example I. The transformation rate was 99.0%, and the yield of vinyl fluoride based on the acetylene introduced was 98%. After the reaction had been running for 50 hours, the acetylene content in the product stream was still less than 5%.

EXAMPLE VI

A fluidized bed reactor was used which consists of a mild steel cylinder 150 mm. in diameter and 500 mm. in height with a double casing for circulating heat transfer fluid for the purpose of heating or cooling. The reactor was charged with 4 liters of the same catalyst, as in Example I, with a particle size in the range of 200μ to 300μ. The gaseous mixture used contained 1.5 moles HF for each mole of acetylene. The flow rate was 60 moles of acetylene per hour which was sufficient to maintain the catalyst in a fluidized state. The reaction was carried out at 300° C. with a constant catalytic activity which was maintained by periodically replacing a portion of the exhaust catalyst with fresh catalyst. The process provided a constant transformation rate of acetylene at 98–99%. Under these conditions, it was noted that the vinyl fluoride output based on the acetylene introduced was higher than 98%. The catalyst consumption was lower than 30 cm.³ per kg. of vinyl fluoride produced.

I claim:

1. A process for producing vinyl fluoride which comprises passing a gaseous mixture of HF and acetylene, containing above about 1 mole of HF to each mole of acetylene, over a cadmium salt catalyst selected from a group consisting of cadmium sulfate, cadmium nitrate, and cadmium acetate at a temperature in the range between 100° C. and 600° C. and recovering vinyl fluoride from the reaction mixture.

2. A process for producing vinyl fluoride which comprises passing a gaseous mixture of HF and acetylene, containing about 1 mole to about 3 moles of HF to each mole of acetylene, over a cadmium salt catalyst at a temperature in the range between about 100° C. and about 600° C., and recovering vinyl fluoride from the reaction mixture, said catalyst being a cadmium salt selected from a group consisting of cadmium sulfate, cadmium nitrate, and cadmium acetate deposited on a catalytic carrier.

3. A process for producing vinyl fluoride which comprises passing a gaseous mixture of HF and acetylene, containing about 1 mole to about 3 moles of HF to each mole of acetylene, over a cadmium salt catalyst at a temperature in the range between 100° C. to about 600° C., said catalyst being a cadmium salt selected from a group consisting of cadmium sulfate, cadmium nitrate, and cadmium acetate deposited on a catalytic carrier selected from a group consisting of activated carbon, alumina, zirconia, and thoria, and recovering vinyl fluoride from the reaction mixture.

4. A process for producing vinyl fluoride which comprises heating a bed of catalyst in the presence of a gaseous mixture of HF and nitrogen to a predetermined temperature in the range between about 100° C. to about 600° C., said catalyst being a cadmium salt selected from a group consisting of cadmium sulfate, cadmium nitrate, and cadmium acetate deposited on a carrier selected from a group consisting of activated carbon, alumina, zirconia, and thoria, passing a gaseous mixture of HF and acetylene, containing about 1 mole to about 3 moles of HF to each mole of acetylene, over said catalyst at the predetermined temperature, and recovering vinyl fluoride from the reaction mixture.

5. A process for producing vinyl fluoride comprising fluidizing a bed of granulated catalytic carrier selected from a group consisting of activated carbon, alumina, zirconia, and thoria containing therein a catalyst selected from a group consisting of cadmium sulfate, cadmium nitrate, and cadmium acetate with a gaseous mixture of HF and acetylene, containing 1 mole to about 3 moles of HF to each mole of acetylene, at a temperature in the range between about 100° C. to about 600° C., periodically replacing a portion of said catalyst to maintain the catalytic strength in the reaction, and recovering vinyl fluoride from the reaction mixture.

References Cited

UNITED STATES PATENTS

| | | | |
|---|---|---|---|
| 2,634,300 | 4/1953 | Hillyer et al. | 260—653.4 |
| 2,716,142 | 8/1955 | Skiles | 260—653.4 |

DANIEL D. HORWITZ, *Primary Examiner.*